(12) United States Patent
Omoda et al.

(10) Patent No.: US 9,343,786 B2
(45) Date of Patent: May 17, 2016

(54) ELECTROCHEMICAL DEVICE

(71) Applicant: Samsung Electronics Co., Ltd., Suwon-si, Gyeonggi-do (KR)

(72) Inventors: Ryo Omoda, Kanagawa (JP); Yuichi Aihara, Kanagawa (JP); Hiroyuki Nishide, Kanagawa (JP); Satoshi Nakajima, Kanagawa (JP); Natsuru Chikushi, Kanagawa (JP)

(73) Assignee: SAMSUNG ELECTRONICS CO., LTD. (KR)

( * ) Notice: Subject to any disclaimer, the term of this patent is extended or adjusted under 35 U.S.C. 154(b) by 227 days.

(21) Appl. No.: 14/097,676

(22) Filed: Dec. 5, 2013

(65) Prior Publication Data

US 2014/0162147 A1 Jun. 12, 2014

(30) Foreign Application Priority Data

Dec. 10, 2012 (JP) .................................. 2012-269868
Aug. 19, 2013 (KR) ........................ 10-2013-0098135

(51) Int. Cl.
*H01M 4/60* (2006.01)
*H01M 12/08* (2006.01)
*H01M 4/38* (2006.01)

(52) U.S. Cl.
CPC .............. *H01M 12/08* (2013.01); *H01M 4/382* (2013.01); *H01M 4/60* (2013.01)

(58) Field of Classification Search
CPC ................................. H01M 4/382; H01M 4/60
USPC ................................................ 429/403, 405
See application file for complete search history.

(56) References Cited

U.S. PATENT DOCUMENTS

| | | | |
|---|---|---|---|
| 5,985,475 A | 11/1999 | Reynolds et al. | |
| 8,388,705 B2 | 3/2013 | Bollon et al. | |
| 9,276,301 B2 * | 3/2016 | Omoda et al. | H01M 12/08 |
| 2003/0157386 A1 | 8/2003 | Gottmann et al. | |
| 2010/0203397 A1 | 8/2010 | Thiemann-Handler et al. | |
| 2010/0330436 A1 | 12/2010 | Ryou et al. | |
| 2014/0162147 A1 | 6/2014 | Omoda et al. | |
| 2014/0162148 A1 | 6/2014 | Omoda et al. | |

FOREIGN PATENT DOCUMENTS

| | | | |
|---|---|---|---|
| JP | 05326035 A | 10/1993 | |
| JP | 05326036 A | 10/1993 | |
| JP | 05326037 A | 10/1993 | |
| JP | 05261851 A | 12/1993 | |
| JP | 06271577 A | 9/1994 | |
| JP | 08007935 A | 12/1996 | |
| JP | 09289045 A | 4/1997 | |
| JP | 09274936 A | 10/1997 | |
| JP | 10064603 A | 6/1998 | |
| JP | 2001272935 A | 10/2001 | |
| JP | 2001273935 A | 10/2001 | |
| JP | 2002177747 A | 6/2002 | |
| JP | 2003017143 A | 1/2003 | |
| JP | 2003036895 A | 2/2003 | |
| JP | 2003297440 A | 10/2003 | |
| JP | 2004288572 A | 10/2004 | |
| JP | 2004319292 A | 11/2004 | |
| JP | 2004319324 A | 11/2004 | |
| JP | 2004319464 A | 11/2004 | |
| JP | 2005518643 A | 6/2005 | |
| JP | 2005294107 A | 10/2005 | |
| JP | 2006134636 A | 5/2006 | |
| JP | 2006142275 A | 6/2006 | |
| JP | 2007080793 A | 3/2007 | |
| JP | 2007141745 A | 6/2007 | |
| JP | 2008010230 A | 1/2008 | |
| JP | 2008059821 A | 3/2008 | |
| JP | 2008300273 A | 11/2008 | |
| JP | 2009099570 A | 5/2009 | |
| JP | 2009230981 A | 10/2009 | |
| JP | 2010118320 A | 5/2010 | |
| JP | 2010528412 A | 8/2010 | |
| JP | 2010528445 A | 8/2010 | |
| JP | 2011014478 A | 1/2011 | |
| JP | 2011500879 A | 1/2011 | |
| JP | 2011119189 A | 6/2011 | |
| JP | 2011171260 A | 9/2011 | |
| JP | 2003168442 A | 6/2013 | |
| KR | 1020040098000 A | 11/2004 | |
| KR | 1020090010373 A | 1/2009 | |
| KR | 1020140074173 A | 6/2014 | |
| KR | 1020140076473 A | 6/2014 | |

* cited by examiner

*Primary Examiner* — Edward Cain
(74) *Attorney, Agent, or Firm* — Cantor Colburn LLP

(57) ABSTRACT

An electrochemical device including: a positive electrode including oxygen as a positive active material; a negative electrode including a lithium ion-intercalatable/deintercalatable material as a negative active material; and an electrolytic solution in fluid communication with the positive electrode and the negative electrode and including a solvent and an oxygen absorbing/desorbing material with an oxygen binding rate of about 60 to about 95% in a pure oxygen atmosphere.

13 Claims, 2 Drawing Sheets

ELECTROCHEMICAL DEVICE

CROSS-REFERENCE TO RELATED APPLICATIONS

This application claims the benefit of Japanese Patent Application No. 2012-269868, filed on Dec. 10, 2012, and Korean Patent Application No. 10-2013-0098135, filed on Aug. 19, 2013, and all the benefits accruing therefrom under 35 U.S.C. §119, the contents of which are incorporated herein in their entirety by reference.

BACKGROUND

1. Field

The present disclosure relates to electrochemical devices including a positive electrode including oxygen as a positive active material, a negative electrode including a lithium ion-intercalatable/deintercalatable material as a negative active material, and an electrolytic solution.

2. Description of the Related Art

There is increasing demand for electrochemical devices including a positive electrode including oxygen as a positive active material, a negative electrode including a lithium ion-intercalatable/deintercalatable material as a negative active material, and an electrolytic solution as next-generation electrochemical devices for vehicles, and the like.

In such electrochemical devices, a large amount of oxygen needs to be supplied to the electrolytic solution in order to improve performance of the electrochemical device, thereby facilitating redox reactions in the electrodes.

In general, oxygen used as a positive active material of an electrochemical device may be supplied from a gas canister or ambient air. However, when oxygen is supplied from the gas canister, the electrochemical device may increase in volume or weight. When oxygen is supplied from the ambient air, there is a need to remove impurities other than oxygen, and thus the amount of available oxygen may be reduced.

Thus, in order to improve performance of electrochemical devices, there remains a need for a material efficiently supplying oxygen to the electrolytic solution.

SUMMARY

Provided are electrochemical devices including an electrolytic solution having an oxygen absorbing/desorbing material that easily forms an oxygen complex and has excellent oxygen absorbability and desorbability, thereby increasing an amount of oxygen supplied to an electrolyte.

Additional aspects will be set forth in part in the description which follows and, in part, will be apparent from the description, or may be learned by practice of the presented embodiments.

According to an aspect of the present disclosure, an electrochemical device includes a positive electrode including oxygen as a positive active material;

a negative electrode including a lithium ion-intercalatable/deintercalatable material as a negative active material; and an electrolytic solution in fluid communication with the positive electrode and the negative electrode and including a solvent and an oxygen absorbing/desorbing material having an oxygen binding rate of about 60% to about 95% in a pure oxygen atmosphere.

The oxygen absorbing/desorbing material may be a tetraphenylporphyrin derivative having a first axial position and a second axial position, and further including a ligand having an electron donating property, coordinated at the first axial position and a pivaloyl group disposed in a direction toward the second axial position.

The oxygen absorbing/desorbing material may be a tetraphenylporphyrin derivative to which an oxygen molecule is coordinated at the second axial position.

The oxygen absorbing/desorbing material may include a tetraphenylporphyrin-metal complex.

The oxygen absorbing/desorbing material may include a tetrapivaloylphenylporphyrin-cobalt complex or a diisophthalimidetetraphenylporphyrin-cobalt complex.

The axial ligand having an electron donating property may include an amine, an imine, an imidazole, or an ether.

The axial ligand having an electron donating property may include a nitrogen-containing organic ligand.

An amount of the oxygen absorbing/desorbing material may be in the range of about 0.1 to about 3 parts by weight based on a total of 100 parts by weight of the solvent.

The solvent may be a non-aqueous organic solvent.

The electrolytic solution may further include a support salt.

The support salt may include at least one of lithium bis(trifluoromethanesulfonyl)imide (LiTFSI) and lithium bis(pentafluoroethanesulfony)imide (LiBETI).

The electrochemical device may be a lithium-air battery.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
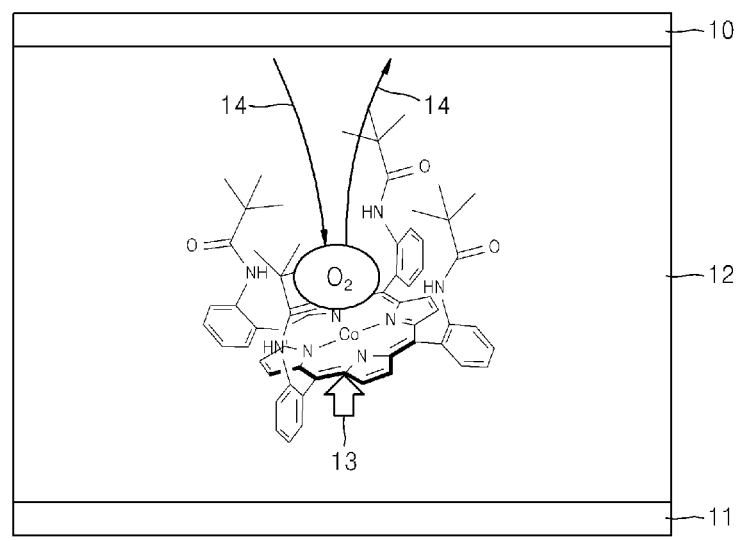
FIG. 1 schematically illustrates a molecular assembly, wherein an oxygen molecule is coordinated to an oxygen absorbing/desorbing material to form an oxygen complex in an electrolyte of an electrochemical device according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an electrochemical device according to an embodiment will be described in detail.

An electrochemical device according to an embodiment includes:

a positive electrode including oxygen as a positive active material;

a negative electrode including a lithium ion-intercalatable/deintercalatable material as a negative active material; and an electrolytic solution in fluid communication with the positive electrode and the negative electrode and including a solvent and an oxygen absorbing/desorbing material with an oxygen binding rate of about 60% to about 95% in a pure oxygen atmosphere.

The electrolytic solution used in the electrochemical device includes the oxygen absorbing/desorbing material having an oxygen binding rate of about 60% to about 95% in a pure oxygen atmosphere.

The oxygen absorbing/desorbing material may be a tetraphenylporphyrin derivative having a first axial position (position 5) and a second axial position (position 6), and further having a structure in which an axial ligand having an electron donating property, in particular a high electron donating ability is coordinated in position 5 and a pivaloyl group is bonded in a direction toward position 6.

The oxygen absorbing/desorbing material may be a tetraphenylporphyrin derivative to which an oxygen molecule may be coordinated at position 6.

FIG. 1 schematically illustrates that an oxygen molecule is coordinated to an oxygen absorbing/desorbing material to form an oxygen complex in an electrolyte of an electrochemical device according to an embodiment.

Referring to FIG. 1, the tetraphenylporphyrin derivative contained in the electrolyte of the electrochemical device includes a pivaloyl group coordinated thereto in a direction toward position 6. Due to steric effect of the pivaloyl group, an oxygen molecule may be surrounded within the pivaloyl group. Thus, the oxygen molecule may be coordinated to the tetraphenylporphyrin derivative in position 6 with high binding force, so that an oxygen complex may be efficiently formed.

The oxygen absorbing/desorbing material may include a tetraphenylporphyrin-metal complex.

As the oxygen absorbing/desorbing material to which the pivaloyl group is bonded is dissolved in the electrolytic solution, the tetraphenylporphyrin-metal complex may improve oxygen absorbability and desorbability in the electrolytic solution. As a result, oxygen that is lacked in the electrolytic solution during high rate discharging may be supplemented by the oxygen absorbing/desorbing material, which releases oxygen into the electrolytic solution.

Examples of the oxygen absorbing/desorbing material may include a tetrapivaloylphenylporphyrin-cobalt complex ("CoTpivPP") or a diisophthalimidetetraphenylporphyrin-cobalt complex ("CoTohthPP").

Figure 2:
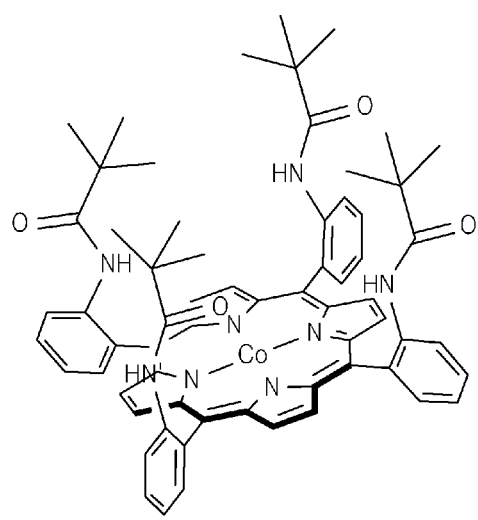
FIG. 2 illustrates a tetrapivaloylphenylporphyrin-cobalt complex ("CoTpivPP")

FIG. 2 illustrates a tetrapivaloylphenylporphyrin-cobalt complex ("CoTpivPP"). The tetrapivaloylphenylporphyrin-cobalt complex ("CoTpivPP") includes a pivaloyl group bound thereto in a direction toward position 6.

The oxygen absorbing/desorbing material is a tetraphenylporphyrin derivative having a first axial position (position 5) and a second axial position (position 6), to which the axial ligand having an electron donating property, in particular a high electron donating ability, is coordinated at the first axial position (position 5) of the metal of a tetraphenylporphyrin-metal complex in addition to the structure in which the pivaloyl group is bonded to the tetraphenylporphyrin-metal complex. Accordingly, formation of the coordinate bond between the oxygen molecule and the tetrapivaloylphenylporphyrin derivative in position 6 opposite to the metal may be facilitated.

The axial ligand having an electron donating property, in particular a high electron donating ability may include an amine such as methyl amine, trimethyl amine, an ether-containing amine, pyridine, hexamethylene diamine, morpholine, and aniline, an imine such as ethylene amine and a Schiff base, an imidazole such as methyl imidazole, benzyl imidazole, trimethyl imidazole, or an ether. For example, an imidazole such as methyl imidazole, benzyl imidazole, and trimethyl imidazole may be efficiently used to improve oxygen affinity of porphyrin derivatives. As used herein, the terms "electron donating property" and "high electron donating ability" mean that the electron donating ability of the ligand is sufficient to provide the desired oxygen absorbing/desorbing properties to the tetraphenylporphyrin-metal complex.

The axial ligand having an electron donating property may include a nitrogen-containing organic ligand having an amino group, a phosphino group, a carboxyl group, a thiol group, or the like and may also include triphenyl phosphine, acetyl acetonate, and the like.

Meanwhile, in the oxygen absorbing/desorbing material, 1 mol of the axial ligand having an electron donating property may be absorbed into 1 mol of the tetraphenylporphyrin-metal complex. Thus, for example, in a reaction between a tetrapivaloylphenylporphyrin-cobalt complex ("CoTpivPP") having a molecular weight of 1,068 and benzylimidazole having a molecular weight of 158, 15 parts by weight or less of benzyl imidazole may be absorbed thereinto based on 100 parts by weight of the tetrapivaloylphenylporphyrin-cobalt complex ("CoTpivPP").

The oxygen absorbing/desorbing material may have an oxygen binding rate of about 60 to about 95%, for example, about 65% to about 95%, in a pure oxygen atmosphere.

The oxygen binding rate may be calculated using absorbance of the oxygen absorbing/desorbing material obtained by UV-VIS spectrum from Drago equation represented by Equation 1 below.

Equation 1

$$p_{O2} = [Co]b\Delta\epsilon(p_{O2}/\Delta A) - K^{-1} \quad (1)$$

An oxygen binding rate of the tetrapivaloylphenylporphyrin-cobalt derivative ("CoTpivPP-MeIm") in which 1-methyl imidazole is coordinated at position 5 will be exemplarily described.

In order to calculate the oxygen binding rate, first, the UV-VIS spectrum of the tetrapivaloylphenylporphyrin-cobalt derivative ("CoTpivPP-MeIm") is measured by supplying pure nitrogen and oxygen having a predetermined partial pressure at 25° C. In an absorption peak at 551 nanometers ("nm") acquired by the supply of oxygen, $A_1$ refers to an absorbance obtained in a pure nitrogen environment, i.e., atmosphere, $A_2$ refers to an absorbance obtained in an oxygen environment, i.e., atmosphere having a predetermined partial pressure, and Δ A refers to a difference between $A_1$ and $A_2$. Since [Co]bΔε is an integer in Equation 1, a proportional relationship is exhibited by illustrating $P_{O2}$ vs. ($P_{O2}/\Delta A$), and an oxygen affinity parameter $p_{50}$ may be obtained using $p_{50}=K^{-1}$.

As the oxygen affinity parameter $p_{50}$ decreases, the oxygen affinity increases. For example, the tetraphenylporphyrin derivative may have an oxygen affinity parameter $p_{50}$ of 20 centimeters of mercury ("cm Hg") using benzyl imidazole, 23 cmHg using trityl imidazole, 31 cmHg using 1-methyl imidazole, and 43 cmHg using imidazole, as the axial ligand having an electron donating property.

Since ΔA increases in proportion to the oxygen binding rate, $p_{50}$ may be calculated by the oxygen binding rate of the porphyrin derivative at each partial pressure of oxygen using ΔA.

For example, the oxygen absorbing/desorbing material according to the current embodiment may have an oxygen binding rate of 91% using benzyl imidazole, 79% using trityl imidazole, 67% using 1-methyl imidazole, and 64% using imidazole, as the axial ligand having an electron donating property, in a pure oxygen atmosphere at 25° C.

A small amount of the oxygen absorbing/desorbing material may be sufficient to improve oxygen absorbability and desorbability of the electrolytic solution as being dissolved therein. The amount of the oxygen absorbing/desorbing material may be in the range of about 0.1 to about 3 parts by weight based on a total of 100 parts by weight of the solvent. When the oxygen absorbing/desorbing material is contained in the electrolyte within the range described above, a concentration of oxygen in the electrolytic solution may be increased by about 5 to about 10 times when compared to the electrolytic solution that does not include the oxygen absorbing/desorbing material. Accordingly, in an electrochemical device including the electrolytic solution having the oxygen absorbing/desorbing material, the amount of oxygen supplied to electrodes such as the positive electrode and the negative electrode may be increased. The electrochemical device may also be operated at high current densities during discharging.

However, the amount of the oxygen absorbing/desorbing material contained in the electrolytic solution may be increased to saturation as long as oxygen does not deteriorate electrical characteristics of the electrochemical device according to the current embodiment.

A lithium-air battery will be described as an example of the electrochemical device.

Figure 3:
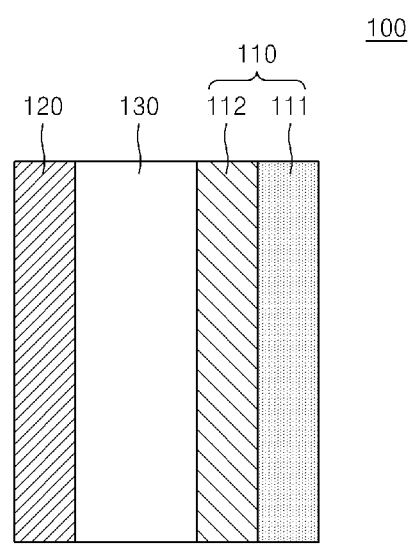
FIG. 3 schematically illustrates a lithium-air battery according to an embodiment.

FIG. 3 schematically illustrates a lithium-air battery 100 according to an embodiment.

Referring to FIG. 3, the lithium-air battery 100 includes a positive electrode 110, a negative electrode 120, and an electrolytic solution 130 in fluid communication with the positive electrode 110 and the negative electrode 120, for example, disposed between the positive electrode 110 and the negative electrode 120.

The positive electrode 110 includes a current collector 111 and a catalyst layer 112, and uses oxygen as a positive active material. Any porous current collector capable of functioning as a gas diffusion layer in which air is diffused and having conductivity may be used as the current collector 111 without limitation. For example, stainless steel, nickel (Ni), aluminum (Al), iron (Fe), titanium (Ti), carbon (C), or the like may be used. For example, the current collector 111 may have a thin film shape, a plate shape, a mesh shape, and a grid shape. For example, the current collector 111 may have a mesh shape. The mesh shape is suitable for the current collector 111 due to high current collecting efficiency.

The catalyst layer 112 may be platinum (Pt), gold (Au), silver (Ag), a manganese oxide, an iron oxide, and the like. For example, the catalyst layer 112 may include a reducing catalyst, formed by connecting an electron donor having a porphyrin ring with an electron acceptor such as a fullerene derivative via an electrically conductive spacer. The donor may be a substituted or unsubstituted compound having a porphyrin ring, such as an Mg or Ni-substituted porphyrin-metal complex. In this regard, a substituent may be a C1-C10 alkyl group, a C1-C10 alkynyl group, or a C6-C10 aryl group. For example, the acceptor may be a fullerene derivative having a fullerene backbone such as a C60, C70, C74, or C76 fullerene, and the spacer may be a condensed nitrogen-containing heterocyclic ring or a hydrocarbon ring. However, any catalyst that is commonly used in a catalyst layer in a positive electrode including oxygen as a positive active material may also be used.

The positive electrode 110 may appropriately include a conductive agent, a binder, a dispersant, and a thickener. Any electron conducting material that does not deteriorate electrochemical characteristics of the electrochemical device according to the current embodiment may be used as the conductive agent. Particularly, natural graphite, carbon black, ketjen black, carbon fiber, and the like may be used. The conductive agent may be used alone or in combinations of at least two thereof. Any material capable of binding an active material to the conductive agent may be used as the binder without limitation. Particularly, a fluorine-based resin such as polytetrafluoroethylene ("PTFE") and polyvinylidene fluoride, and a thermoplastic resin such as polypropylene may be used. An amount of the binder may be 30% by weight or less, for example, in the range of about 1 to about 10% by weight without being limited thereto.

The negative electrode 120 includes a current collector (not shown) and a negative active material.

Any current collector with conductivity may be used in the negative electrode 120 without limitation. For example, copper (Cu), stainless steel, nickel (Ni), or the like may be used. For example, the current collector of the negative electrode 120 may have a thin film shape, a plate shape, a mesh shape, and a grid shape.

The negative active material may be any lithium ion-intercalatable/deintercalatable material such as lithium, a lithium oxide, and a lithium alloy without being limited thereto. For example, lithium metal may be used.

The negative electrode 120 may appropriately include a conductive agent, a binder, a dispersant, and a thickener. In this regard, the same conductive agent, binder, dispersant, and thickener as for the positive electrode 110 may be used for the negative electrode 120 in the same amounts.

The positive electrode 110 and the negative electrode 120 may respectively be mixed with and dispersed in suitable solvents to form a positive electrode material and a negative electrode material in pastes. The positive electrode material and the negative electrode material may further include a conductive agent, a binder, and the like, appropriately, in addition to the positive active material and the negative active material. Each of the prepared positive electrode material and negative material may be coated on the surface of a current collector to form a positive electrode layer and a negative electrode layer.

Any material capable of conducting metal ions of the negative active material and dissolving the oxygen absorbing/desorbing material may be used as the electrolytic solution 130 without limitation. For example, an aqueous electrolytic solution, a non-aqueous electrolytic solution, or a polymer gel electrolytic solution may be used.

The electrolytic solution 130 includes the oxygen absorbing/desorbing material having an oxygen binding rate of about 60% to about 95% in a pure oxygen atmosphere as described above. The oxygen absorbing/desorbing material may be a tetraphenylporphyrin derivative including a first axial position (position 5) and a second axial position (position 6), and further including a ligand having an electron donating property coordinated at position 5 and a pivaloyl group disposed in a direction toward position 6. The oxygen absorbing/desorbing material may be a tetraphenylporphyrin derivative to which an oxygen molecule may be coordinated at position 6. Absorption and desorption of oxygen may reversibly occur in the electrolytic solution 130 without causing side reactions by dissolving the oxygen absorbing/desorbing material in the electrolytic solution 130.

For example, the electrolytic solution 130 may be a non-aqueous electrolytic solution.

For example, a solvent used in the non-aqueous electrolytic solution may include a cyclic carbonate such as ethylene carbonate, propylene carbonate, butylene carbonate, and vinylene carbonate, a chain type carbonate such as diethyl carbonate, dimethyl carbonate, and ethylmethyl carbonate, a cyclic ester carbonate such as γ-butyrolactone and γ-valerolactone, a cyclic ether such as tetrahydrofuran and 2-methyltetrahydrofuran, a chain type ether such as dimethoxyethane, ethylene glycol dimethylether, and a known organic solvent such as chloroethylene carbonate, fluoroethylene carbonate, 3-methoxy propionitrile, trimethyl phosphate, triphenyl phosphate, sulfolane, and dimethyl sulfoxide.

In addition, an ionic liquid such as N,N-diethyl-N-ethyl-N-(2-methoxyethyl)ammonium bis(trifluorosulfonyl)imide, N-methyl-N-propylpiperidinium bis(trifluorosulfonyl)imide, 1-methyl-3-propylimidazolium bis(trifluorosulfonyl)imide, and 1-ethyl-3-butylimidazolium tetrafluoroborate may also be used. The solvent may be used alone or in combinations of at least two thereof.

The electrolytic solution may further include a support salt. The support salt is dissolved in the solvent to function as a lithium-ion source in a battery. Examples of the support salt may include hexafluoro phosphate ($LiPF_6$), perchlorate ($LiClO_4$), tetrafluoro borate ($LiBF_4$), pentafluoroarsenate ($LiAsF_5$), bis(trifluoromethane sulfonyl)imide salt ($Li(CF_3SO_2)_2N$), bis(pentafluoroethanesulfonyl)imide salt ($LiN(C_2F_5SO_2)_2$), trifluoromethane sulfonate ($Li(CF_3SO_3)$), and nonafluorobutane sulfonate ($Li(C_4F_9SO_3)$). The support salt may be used alone or in combinations of at least two thereof.

However, when a tetraphenyl porphyrin derivative, e.g., a tetraphenylporphyrin-metal complex, is used as the oxygen absorbing/desorbing material contained in the electrolytic solution, the type of the axial ligand having an electron donating property, which is coordinated thereto, and the type of the support salt may be properly combined for the formation of the oxygen complex.

For example, when the electrolytic solution includes $LiBF_4$ as a support salt and benzyl imidazole coexists therein as the axial ligand, the support salt such as $LiBF_4$ may be coordinated at position 6 of the tetraphenylporphyrin derivative to which oxygen is to be coordinated, thereby inhibiting formation of a coordinate bond with the oxygen.

Thus, the support salt may be selected in consideration of the type of the added axial ligand having an electron donating property in order to form the oxygen complex with high binding force via formation of the coordinate bond between the oxygen molecule and the tetraphenylporphyrin derivative in position 6 thereof. When benzyl imidazole is used as the axial ligand having an electron donating property, the support salt may include at least one of lithium bis(trifluoromethanesulfonyl)imide ("LiTFSI") and lithium bis(pentafluoroethanesulfonyl)imide ("LiBETI").

Lithium bis(trifluoromethanesulfonyl)imide ("LiTFSI") and lithium bis(pentafluoroethanesulfonyl)imide ("LiBETI") are molecules having large Van der Waals volumes. Thus, when the electrolytic solution includes at least one thereof, the coordinate bond between oxygen and the tetraphenylporphyrin derivative in position 6 may not be inhibited by the support salt.

Lithium bis(trifluoromethanesulfonyl)imide ("LiTFSI") or/and lithium bis(pentafluoroethanesulfonyl)imide ("LiBETI") may be efficiently used as the support salt when the tetraphenylporphyrin derivative includes imidazole, methyl imidazole, or trityl imidazole, as the axial ligand, and when the tetraphenylporphyrin derivative to which a polymer having a side chain of imidazole is coordinated.

The amount of the support salt may be increased as long as electrical characteristics of the electrochemical device according to the current embodiment are not deteriorated. An amount of the support salt may be in the range of about 2 to about 70 parts by weight, for example about 20 to about 50 parts by weight, based on a total of 100 parts by weight of the solvent.

The amount of lithium bis(trifluoromethanesulfonyl)imide ("LiTFSI") may be in the range of about 20 to about 35 parts by weight, for example, about 25 to about 35 parts by weight. The amount of lithium bis(pentafluoroethanesulfonyl)imide ("LiBeTI") may be in the range of about 25 to about 40 parts by weight, for example, about 30 to about 40 parts by weight. The electrolytic solution may further include another metal salt as long as electrical support characteristics of the electrochemical device are not deteriorated. For example, the metal salt may be $AlCl_3$, $MgCl_2$, NaCl, KCl, NaBr, KBr, or $CaCl_2$.

The electrolytic solution may be prepared by dissolving the axial ligand having an electron donating property in a solvent including a non-coordinated tetraphenylporphyrin derivative and the support salt, or by adding the axial ligand to a solvent. By adding the axial ligand to the solvent, the axial ligand is naturally coordinated at position 5 of the tetraphenylporphyrin derivative, thereby forming the oxygen absorbing/desorbing material.

In addition, a lithium ion conductive solid electrolyte membrane (not shown) may be disposed between the positive electrode 110 and the negative electrode 120. Examples of the lithium ion conductive solid electrolyte membrane may be lithium ion conductive glass, lithium ion conductive crystals (ceramics or glass-ceramics), or an inorganic material including mixtures thereof. For chemical stability, the lithium ion conductive solid electrolyte membrane may be an oxide.

In addition, a separator (not shown) may be disposed between the lithium ion conductive solid electrolyte membrane and the positive electrode 110. The separator may be any separator having a composition which may be used in the lithium-air battery. For example, a polymer non-woven fabric such as a polypropylene non-woven fabric and a polyphenylene sulfide non-woven fabric, a porous film of an olefin resin such as polyethylene or polypropylene, or any combination of at least two thereof may be used.

The term "air" used herein is not limited to atmospheric air, and may include a composition of air including oxygen or pure oxygen gas. This wide definition of the term "air" may also be applied to, for example, the air battery, or the like.

The electrochemical device may also be a fuel cell using hydrogen and alcohol as fuels in addition to the lithium-air battery described above.

Hereinafter, an oxygen absorbing/desorbing material having a structure in which benzoimidazole is coordinated at position 5 of a tetrapivaloylphenylporphyrin-cobalt complex ("CoTpivPP") according to an embodiment will be described. Embodiments will be described in further detail with reference to the following examples. These examples are for illustrative purposes only and are not intended to limit the scope of the claims.

EXAMPLES

Example 1

Synthesis of Tetrapivaloylphenylporphyrin-Cobalt Complex ("CoTpivPP")

A tetrapivaloylphenylporphyrin-cobalt complex ("CoTpivPP") may be synthesized using a known method. For example, a three stage synthesis including synthesis of $H_2$TamPP, synthesis of $H_2$TpivPP, and synthesis of CoTpivPP was performed.

1. Synthesis of Amino Compound ("$H_2$TamPP")

20.0 grams ("g") (132.4 millimoles ("mmol")) of 2-nitrobenzaldehyde and 9.2 milliliters ("ml") (132.4 mmol) of pyrrole were dissolved in 400 milliliters ("mL") of acetic acid in a 500 mL neck flask, and the flask was refluxed while boiling at 120 degrees Centigrade ("° C.") for 30 minutes. Then, the solution was cooled to room temperature, 50 mL of chloroform was added thereto, and the mixture was filtered and cleaned using chloroform. The resultant was dried to obtain 3.53 g a nitro compound (Yield: 13%). 5.0 g (6.3 mmol) of the nitro compound was dissolved in 250 mL of hydrochloric acid, and 19.2 g (84.9 mmol) of tin chloride dihydrate was added thereto. Then, the mixture was stirred at 70° C. for 30 minutes for reduction. After the reaction was completed, the resultant was neutralized with ammonia water while sufficiently cooling and subjected to extraction using chloroform. The solvent was removed, and the resultant was re-crystallized using a mixed solution of ethanol and hexane. Then, the resultant was filtered, cleaned using methanol, and dried to obtain 3.36 g of an amino compound ("$H_2$TamPP") including 4 types of atropoisomers ($\alpha$, $\alpha$, $\alpha$, $\alpha$-isomer; $\alpha$, $\alpha$, $\beta$, $\beta$-isomer; $\alpha$, $\beta$, $\alpha$, $\beta$-isomer; and $\alpha$, $\alpha$, $\alpha$, $\beta$-isomer) (Yield: 79%).

2. Synthesis of Free Base Compound ("$H_2$TpivPP")

The atropoisomers are in an optical and thermal equilibrium state. The $\alpha$, $\alpha$, $\alpha$, $\alpha$-isomer exhibits strong adsorption properties to silica gel (chloroform/diethyl ether (v/v=4/1), $R_f$ values: $\alpha$, $\alpha$, $\alpha$, $\alpha$-isomer: 0.04; $\alpha$, $\alpha$, $\beta$,$\beta$-isomer: 0.43; $\alpha$, $\beta$, $\alpha$, $\beta$-isomer: 0.64; and $\alpha$, $\alpha$, $\alpha$, $\beta$-isomer: 0.77). The following experiments until a pivaloyl group is formed were performed in a shading condition.

3.0 g (4.45 mmol) of the amino compound was dissolved in 150 mL of benzene, and a mixture of the solution and 72 g of silica gel was refluxed while boiling at 80° C. for 24 hours. Porphyrin-adsorbed silica gel was filtered and cleaned using chloroform to elute the $\alpha$, $\beta$, $\alpha$, $\beta$-isomer and the $\alpha$, $\alpha$, $\beta$, $\beta$-isomer. The resultant was fractionated by column chromatography using a solvent of chloroform/diethyl ether (volume to volume ("v/v")=4/1) to obtain 0.46 g of the $\alpha$, $\alpha$, $\alpha$, $\beta$-isomer (Yield: 15%). Then, 2.34 g of the $\alpha$, $\alpha$, $\alpha$, $\alpha$-isomer was obtained using a solvent of chloroform/acetone (v/v=1/1) (Yield: 78%). 2.34 g of the $\alpha$, $\alpha$, $\alpha$, $\alpha$-isomer (Yield: 78%) and 10.8 mL (40 equiv, 138.8 mmol) of pyridine were dissolved in 100 mL of chloroform. 17.1 mL (40 equiv, 138.8 mmol) of pivalic acid chloride was dropped thereto in an ice bath, and the mixture was maintained at 0° C. for 1 hour and at room temperature for 12 hours. Pyridine and pyridine hydrochloride were removed by cleaning using an aqueous ammonium solution, as a weak basic solution. Then, the resultant was neutralized by cleaning using pure water, and then subjected to chloroform extraction to obtain 2.75 g of a free base compound ("$H_2$TpivPP") (Yield: 78%).

3. Synthesis of Tetrapivaloylphenylporphyrin-Cobalt Complex ("CoTpivPP")

Nitrogen substitution was performed for 30 minutes or more in order to prevent irreversible oxidation of cobalt (II) by water and oxygen. Then, 0.50 g (0.5 mmol) of the free base compound ("$H_2$TpivPP") and 3.0 mL of triethyl amine were dissolved in 60 mL of chloroform in a nitrogen atmosphere. 3.50 g (40 equivalents ("equiv"), 20.0 mmol) of oxidized anhydrous cobalt (II) dissolved in 30 mL of methanol was dropped thereto. Then, the mixture was refluxed while boiling at 70° C. for 24 hours. After the reaction was terminated, unreacted cobalt acetate (II) was filtered, a concentrated remaining reaction solution was purified by a basic alumina column using chloroform as a solvent, and the dissolved cobalt acetate (II) was completely removed. Continuously, flash column chromatography was performed using diethyl ether/hexane (v/v=95/5) as a solvent ($R_f$ values: CoTpivPP: 0.35; and $H_2$TpivPP: 0.25) to obtain 0.35 g of a tetrapivaloylphenylporphyrin-cobalt complex (CoTpivPP) (Yield: 65%).

The tetrapivaloylphenylporphyrin-cobalt complex ("CoTpivPP") may be synthesized with reference to disclosures by *J. Am. Soc. Chem.*, 97, 1427 (1974).

Preparation of Oxygen Absorbing/Desorbing Material

The tetrapivaloylphenylporphyrin-cobalt complex ("CoTpivPP") was dissolved in γ-butyrolactone to prepare a 5 micromolar ("μM") tetrapivaloylphenylporphyrin-cobalt complex ("CoTpivPP") solution. Benzyl imidazole, as an axial ligand having high electron donating ability, was added to the tetrapivaloylphenylporphyrin-cobalt complex ("CoTpivPP") solution in a predetermined amount, thereby obtaining an oxygen absorbing/desorbing material in which benzyl imidazole is coordinated to the tetrapivaloylphenylporphyrin-cobalt complex ("CoTpivPP") at position 5.

Examples 2 to 4

Oxygen absorbing/desorbing materials were prepared in the same manner as in Example 1, except that imidazole, 1-methyl imidazole, and trityl imidazole were respectively added to the tetrapivaloylphenylporphyrin-cobalt complex ("CoTpivPP") solution in predetermined amounts. As a result, oxygen absorbing/desorbing materials in which imidazole, 1-methyl imidazole, and trityl imidazole are respectively coordinated to the tetrapivaloylphenylporphyrin-cobalt complex ("CoTpivPP") at position 5.

Comparative Example 1

1. Synthesis of Amino Compound ("H$_2$TamPP")

20.0 g (132.4 mmol) of 2-nitrobenzaldehyde and 9.2 ml (132.4 mmol) of pyrrole were dissolved in 400 mL of acetic acid in a 500 mL neck flask, and the flask was refluxed while boiling at 120° C. for 30 minutes. Then, the solution was cooled to room temperature, 50 mL of chloroform was added thereto, and the mixture was filtered and cleaned using chloroform. The resultant was dried to obtain 3.53 g a nitro compound (Yield: 13%). 5.0 g (6.3 mmol) of the nitro compound was dissolved in 250 mL of hydrochloric acid, and 19.2 g (84.9 mmol) of tin chloride dihydrate was added thereto. Then, the mixture was stirred at 70° C. for 30 minutes for reduction. After the reaction was completed, the resultant was neutralized with ammonia water while sufficiently cooling and subjected to extraction using chloroform. The solvent was removed, and the resultant was re-crystallized using a mixed solution of ethanol and hexane. Then, the resultant was filtered, cleaned using methanol, and dried to obtain 3.36 g of an amino compound ("H$_2$TamPP") including 4 types of atropoisomers (α, α, α, α-isomer; α, α, β, β-isomer; α, β, α, β-isomer; and α, α, α, β-isomer) (Yield: 79%).

2. Synthesis of Free Base Compound (H$_2$TpivPP)

The atropoisomers are in an optical and thermal equilibrium state. The α, α, α, α-isomer exhibits strong adsorption properties to silica gel (chloroform/diethyl ether (v/v=4/1), R$_f$ values: α, α, α, α-isomer: 0.04; α, α, β, β-isomer: 0.43; α, β, α, β-isomer: 0.64; and α, α, α, β-isomer: 0.77). The experiments were performed in a shading condition.

3.0 g (4.45 mmol) of the amino compound was dissolved in 150 mL of benzene, and a mixture of the solution and 72 g of silica gel was refluxed while boiling at 80° C. for 24 hours. Porphyrin-adsorbed silica gel was filtered and cleaned using chloroform to elute the α, β, α, β-isomer and the α, α, β, β-isomer. The resultant was fractionated by column chromatography using a solvent of chloroform/diethyl ether (v/v=4/1) to obtain 0.46 g of the α, α, α, β-isomer (Yield: 15%).

Then, 2.34 g of the α, α, α, α-isomer was obtained using a solvent of chloroform/acetone (v/v=1/1) (Yield: 78%). 2.34 g of the α, α, α, α-isomer (Yield: 78%) and 10.8 mL (40 equiv, 138.8 mmol) pyridine were dissolved in 100 mL of chloroform. Pyridine and pyridine hydrochloride were removed by cleaning using an aqueous ammonium solution, as a weak basic solution. Then, the resultant was neutralized by cleaning using pure water, and then subjected to chloroform extraction to obtain 2.75 g of a free base compound ("H$_2$TpivPP") (Yield: 78%). 3. Synthesis of Tetraphenylporphyrin-cobalt Complex ("CoTpivPP") to which Pivaloyl Group is not Coordinated Nitrogen substitution was performed for 30 minutes or more in order to prevent irreversible oxidation of cobalt (II) by water and oxygen. Then, 0.50 g (0.5 mmol) of the free base compound ("H$_2$TpivPP") and 3.0 mL of triethyl amine were dissolved in 60 mL of chloroform in a nitrogen atmosphere. 3.50 g (40 equiv, 20.0 mmol) of oxidized anhydrous cobalt (II) dissolved in 30 mL of methanol was dropped thereto. Then, the mixture was refluxed while boiling at 70° C. for 24 hours. After the reaction was completed, unreacted cobalt acetate (II) was filtered, a concentrated remaining reaction solution was purified by a basic alumina column using chloroform as a solvent, and the dissolved cobalt acetate (II) was completely removed. Continuously, flash column chromatography was performed using diethyl ether/hexane (v/v=95/5) as a solvent (R$_f$ values: CoTpivPP: 0.35; and H$_2$TpivPP: 0.25) to obtain 0.35 g of a tetrapivaloylphenylporphyrin-cobalt complex ("CoTpivPP") (Yield: 65%).

Evaluation of Oxygen Absorbability and Desorbability

Oxygen absorbabilities and desorbabilities of the oxygen absorbing/desorbing materials prepared according to Examples 1 to 4 and the tetraphenylporphyrin-cobalt complex ("CoTpivPP") prepared according to Comparative Example 1 were evaluated according to a method of evaluating oxygen affinity as described below.

That is, first, 1.0 M solutions were respectively prepared by dissolving each of the oxygen absorbing/desorbing materials prepared according to Examples 1 to 4 in γ-butyrolactone. Pure nitrogen was supplied to each of the solutions at 25° C., and UV-VIS spectrum was measured at 551 nm to obtain absorbance A$_1$. Then, oxygen was supplied to provide a pure oxygen atmosphere, and UV-VIS spectrum was measured at 551 nm to obtain absorbance A$_2$. The oxygen binding rate of each solution was calculated from Drago equation represented by Equation 1 above using an absorbance difference ΔA(A$_2$−A$_1$). In addition, oxygen affinity parameter p$_{50}$ of each of the oxygen absorbing/desorbing materials prepared according to Examples 1 to 4 was obtained.

The oxygen affinity parameters p$_{50}$ and the oxygen binding rates of the oxygen absorbing/desorbing materials prepared in Examples 1 to 4 and the tetraphenylporphyrin-cobalt complex ("CoTpivPP") prepared according to Comparative Example 1 were shown in Table 1 below.

TABLE 1

|  | Axial ligand having high electron donating ability | Oxygen affinity parameter p$_{50}$/cm Hg | Oxygen binding rate (%) |
| --- | --- | --- | --- |
| Example 1 | benzyl imidazole | 20 | 91 |
| Example 2 | Imidazole | 43 | 64 |
| Example 3 | 1-methyl imidazole | 31 | 67 |

TABLE 1-continued

|  | Axial ligand having high electron donating ability | Oxygen affinity parameter $p_{50}$/cm Hg | Oxygen binding rate (%) |
| --- | --- | --- | --- |
| Example 4 | trityl imidazole | 23 | 79 |
| Comparative Example 1 | — | not measurable | less than 10 |

The oxygen absorbing/desorbing materials of Examples 1 to 4 had higher oxygen binding rates than the tetraphenylporphyrin-cobalt complex ("CoTpivPP") of Comparative Example 1. In addition, the oxygen binding rates of the oxygen absorbing/desorbing materials of Examples 1 to 4 were greater than 60%, and the oxygen affinity parameter $p_{50}$ of the tetraphenylporphyrin-cobalt complex ("CoTpivPP") of Comparative Example 1 was could not be measured in the solvent.

As described above, according to the one or more of the above embodiments, in the electrochemical device including a positive electrode including oxygen as a positive active material, a negative electrode including a metal as a negative active material, and an electrolytic solution including a solvent and an oxygen absorbing/desorbing material with an oxygen binding rate of about 60% to about 95% in a pure oxygen atmosphere, oxygen may be efficiently supplied to the electrolytic solution.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An electrochemical device comprising:
a positive electrode comprising oxygen as a positive active material;
a negative electrode comprising a lithium ion-intercalatable/deintercalatable material as a negative active material; and
an electrolytic solution in fluid communication with the positive electrode and the negative electrode and comprising a solvent and an oxygen absorbing/desorbing material having an oxygen binding rate of about 60% to about 95% in a pure oxygen atmosphere.

2. The electrochemical device of claim 1, wherein the oxygen absorbing/desorbing material is a tetraphenylporphyrin compound comprising a first axial position and a second axial position, and further comprising a ligand having an electron donating property, coordinated at the first axial position and a pivaloyl group bonded in a direction toward the second axial position.

3. The electrochemical device of claim 2, wherein the oxygen absorbing/desorbing material is a tetraphenylporphyrin compound to which an oxygen molecule is coordinated at the second axial position.

4. The electrochemical device of claim 1, wherein the oxygen absorbing/desorbing material comprises a tetraphenylporphyrin-metal complex.

5. The electrochemical device of claim 1, wherein the oxygen absorbing/desorbing material comprises a tetrapivaloylphenylporphyrin-cobalt complex or a diisophthalimide-tetraphenylporphyrin-cobalt complex.

6. The electrochemical device of claim 2, wherein the ligand having an electron donating property comprises an amine, an imine, an imidazole, or an ether.

7. The electrochemical device of claim 2, wherein the ligand having an electron donating property comprises a nitrogen-containing organic ligand.

8. The electrochemical device of claim 1, wherein an amount of the oxygen absorbing/desorbing material is in the range of about 0.1 to about 3 parts by weight based on 100 parts by weight of the solvent.

9. The electrochemical device of claim 1, wherein the solvent is a non-aqueous organic solvent.

10. The electrochemical device of claim 1, wherein the electrolytic solution further comprises a support salt.

11. The electrochemical device of claim 10, wherein the support salt comprises at least one of lithium bis(trifluoromethanesulfonyl)imide and lithium bis(pentafluoroethanesulfonyl)imide.

12. The electrochemical device of claim 1, wherein the electrochemical device is a lithium-air battery.

13. The electrochemical device of claim 1, wherein the negative active material is lithium metal.

* * * * *